United States Patent [19]
Heitmann et al.

[11] Patent Number: 5,390,266
[45] Date of Patent: Feb. 14, 1995

[54] OPTICAL ELEMENT

[75] Inventors: Walter Heitmann, Gross-Bieberau; Heinrich Stenger, München, both of Germany

[73] Assignee: Electronic Production Partners GmbH, München, Germany

[21] Appl. No.: 133,731

[22] Filed: Oct. 4, 1993

[30] Foreign Application Priority Data

Oct. 5, 1992 [DE] Germany ................. 4233489

[51] Int. Cl.⁶ ................................. G02B 6/26
[52] U.S. Cl. ........................... 385/44; 385/22; 385/47; 385/48; 385/52
[58] Field of Search ............ 385/22, 38, 39, 44, 385/47, 48, 50, 51, 52

[56] References Cited

U.S. PATENT DOCUMENTS

| | | | |
|---|---|---|---|
| 4,204,742 | 5/1980 | Johnson et al. | 385/23 |
| 4,303,302 | 12/1981 | Ramsey et al. | 385/22 |
| 4,339,170 | 7/1982 | Winzer | 385/39 |
| 4,351,585 | 9/1982 | Winzer et al. | 385/44 |
| 4,456,329 | 6/1984 | Henderson et al. | 385/44 |
| 4,564,260 | 1/1986 | Dirmeyer et al. | 385/44 |
| 4,725,115 | 2/1988 | Beasley | 385/39 |
| 4,893,889 | 1/1990 | Iwakiri et al. | 385/39 |
| 5,129,022 | 7/1992 | Marcus | 385/47 |
| 5,136,681 | 8/1992 | Takahashi | 385/40 |
| 5,253,312 | 10/1993 | Payne et al. | 385/31 |
| 5,305,401 | 4/1994 | Becker et al. | 385/24 |

FOREIGN PATENT DOCUMENTS

| | | | |
|---|---|---|---|
| 0306604 | 3/1989 | European Pat. Off. | G02B 26/02 |
| 3644802 | 7/1988 | Germany | G02B 6/24 |
| 3716836 | 12/1988 | Germany | G02B 6/24 |
| 4101791 | 12/1991 | Germany | G02B 26/02 |

OTHER PUBLICATIONS

Dr. Max Born; Optyik; (no month available) 1965; Springer Publishing, p. 41.

*Primary Examiner*—Frank Gonzalez
*Attorney, Agent, or Firm*—Robert W. Becker & Associates

[57] ABSTRACT

The optical element provides for the displacement of two end sections having slanted end faces. The slanted end faces have such an angle to the optical axis of the fiber, that the limit angle for total reflection is exceeded. The displacement remains substantially below the diameter of the fiber.

33 Claims, 5 Drawing Sheets

OPTICAL ELEMENT

BACKGROUND OF THE INVENTION

This invention concerns an optical element for affecting the transmission characteristics through an optical system having at least two optical fiber end sections one of which is displaceable. The end sections can be optically coupled.

Such an element is for instance known from German Offenlegungsschrift 36 44 802. With such an element a switching function is realized by displacing optical fiber ends radially relative to one another so that light can travel from one fiber end section to the other fiber end section, while the light passage is blocked when the end sections are decoupled.

However, during switching, the known device needs to travel a considerable shifting distance, which practically corresponds to the thickness of the core of the optical fiber. This shifting distance already causes high switching times. In order to reduce the switching times, fast acting elements could be used. However, such elements require relatively high operating currents, are rather big and expensive. Such switches are therefore unsuited for constructing an optical fiber network.

An optical element for switching of optical power in optical fibers, which operates based on a different principle, has been known, for instance, from the book "Optische Telekommunikationssysteme, Band I; Physik und Technik", Publisher: W. Haist, Damm-Verlag KG, Gelsenkirchen-Buer. On pages 105 and 106 switchable light beam couplers are described, which operate with an integrated optical construction. With these couplers very short switching times are achievable. However, a coupling of optical fibers to the in- and output of planar structures is required, which causes, because of the different field distribution, high losses at the coupling regions.

Another disadvantage is that at the connection mechanical tolerances below 1 μm have to be maintained. This Generates high manufacturing costs.

In addition, the planar wave guides themselves have comparatively high transition losses, so that transition losses of an optical switch lower than 3 dB would hardly be realizable.

Furthermore, with switching elements in integrated optical construction, the dependence on wavelength and polarization as well as the insufficient cross-talk attenuation, especially in local networks, is a disadvantage.

The present invention has therefore the object to create an optical element which can be affected in its transition function by an optical system of the aforementioned kind, which in respect to transition loss, non-pass attenuation, return loss, cross talk, switching time, manufacturing cost and/or size is an improvement over the existing optical elements and which is suited to be used in optical networks and therefore comes close to the requirement for an ideal switch.

SUMMARY OF THE INVENTION

The optical element for affecting light transmission characteristics of an optical system according to the present invention is primarily characterized by:

at least a first and a second optical fiber, wherein the first optical fiber has a first end section and the second optical fiber has a second end section to be optically coupled and decoupled to one another;

each one of the first and the second end sections having a slanted end face, with an angle of slant of at least one of the slanted end faces exceeding a critical angle of total reflection; and at least one of the first and the second end sections being displaceable relative to the other one, wherein a distance of displacement between the slanted end faces is substantially smaller than a diameter of the optical fibers.

Preferably, the optical fibers are divided optical fibers.

The distance of displacement is defined between a position of contact of the slanted end faces and a spaced-apart position of a spacing of at least 1 μm. In the spaced-apart position the spacing is transverse to an axis of the optical fibers.

The optical element preferably performs a switching function or a multiplexing function or a modulating function.

The optical element further comprises a first adjusting element for displacing the displaceable one of the first and second end sections, the first adjusting element being a piezoelectric element.

The piezoelectric element is a piezoelectric crystal or a piezoelectric ceramic, preferably the piezoelectric crystal is quartz.

In a preferred embodiment, one of the first and the second end sections is displaceable and the other one is stationary. The distance of displacement is substantially one millimeter. Each one of the first and second optical fibers, including the first and second end sections, is comprised of a core and a mantle. At least in an area of displacement of the displaceable one of the first and second end sections, the mantle is partially removed.

The optical element further comprises a mechanical coupling support for connecting the first and the second end sections to one another. The coupling support is designed such that a spacing between the first and the second end sections varies only very little with temperature variations. The coupling support is comprised of quartz glass and extends in a direction of a main axis of the first adjusting element.

The optical element further comprises a third optical fiber and a third end section. Each one of the first and second optical fibers, including the first and second end sections, is comprised of a core and a mantle, whereby in an area of tapering of the end face of one of the first and second end sections a portion of the mantle is removed to form a first, preferably planar, surface that is substantially parallel to the axis of the first and second optical fibers. The third end section has an end face that abuts at the first surface. The third end section, when the first and the second end sections are decoupled, receives a totally reflected light beam. The portion of the mantle is advantageously removed to a thickness of a few μm, and the end face of the third end section is adapted to the first planar surface. The third optical fiber extends expediently transversely to the first and the second optical fibers, preferably perpendicularly.

The optical element further comprises a correcting element positioned between the planar surface and the end face of the third end section. The correcting element has a refractive index distribution suitable for correcting a light beam deformation of the reflected light beam.

Preferably, the optical element further comprises a fourth optical fiber and a fourth end section, wherein in an area of tapering of the end face of the other one of the first and second end sections a portion of the mantle is removed to form a second planar surface that is substantially parallel to an axis of the first and the second optical fibers. The fourth end section has an end face that abuts at the second planar surface. The third end section is fixedly connected to the first surface and the third end section and the respective one of the first and second end sections are displaceable together by the first adjusting element.

The optical element further comprises a second adjusting element, wherein the fourth end section is fixedly connected to the second planar surface and wherein the fourth end section and the other one of the first and second end sections are displaceable together by the second adjusting element.

The angle of slant of the slanted end faces of the first and second end sections is substantially identical. One of the slanted end faces has a depth of roughness of less than 30 nm, preferably less than 10 nm.

At least one of the slanted end faces is convexly shaped.

The optical element further comprises a casing for receiving the first and the second end sections. The casing is expediently filled with an inert gas or at least partially evacuated. Advantageously, the casing is comprised of a material having a low thermal expansion coefficient, preferably the material is quartz.

The optical element further comprises a first and a second adjusting element, the first adjusting element connected to the first end section for adjusting a position of the first end section relative to the second end section and the second adjusting element connected to the second end section for adjusting a position of the second end section relative to the first end section.

In another embodiment of the present invention, the optical element further comprises a relative adjusting element for adjusting a relative position of the first end section to the second end section.

In a preferred embodiment of the present invention, the second end section of the second optical fiber is displaceable and several of the first optical fibers with the respective end sections are provided, the first end sections being stationary. The second end section is displaceable such that a selective coupling and decoupling with each one of the first end sections is possible for multiplexing a plurality of optical fibers. The slanted end faces of the first and the second end sections during coupling are positioned such that the slanted end faces are substantially in a same plane.

It is especially advantageous that the invention allows the desired switch or modulation function already with very small displacements. These displacements are, for instance, about two orders of magnitude smaller than what is called for in the state of the art. At the same time the ratio between transition loss and non-pass loss is not worsened.

Especially beneficial is the high possible working frequency of the optical switch which is made possible by the required small displacements. Although mechanically displaced parts are involved, the calculations predict surprisingly high limits of about 100 MHz.

According to the invention, both opposite fiber end faces are, relative to their optical axis, slanted such that a total reflection exists which means the traveling light is completely reflected at the separated end sections.

This reflection is complete and without losses. However, a small portion of the electromagnetic field penetrates the optically thinner medium in an exponentially decreasing wave.

The penetration depth of the field amplitude A can be calculated, as described in the book "Optik", Dr. Max Born, Springer Publishing, Berlin, 1965, page 41, with the following equation:

$$A = e^{-2\pi z/\lambda_2}$$

where z is the distance from the boundary area and $\lambda_2$ is the wavelength in the optically thinner medium. The attenuation of the optical power equals the squared field amplitude A. This means that for the distance of a wavelength, approximately 1.5 µm for light, a value of −55 dB can be calculated. If therefore two slanted end faces facing each other are spaced at a distance of >1.5 µm relative to each other, there is practically no transition of light into the second end section. But when the two end section approach one another to a distance where an optical contact occurs, then, according to the theory, a loss-free passage of light is possible.

In this context it is advantageous, to make the slanted end faces as smooth and flat as possible. It is further advantageous that, by pressing the slanted end faces against one another a further smoothing of the surfaces results reducing the depth of roughness to a greater extent. With plug-in connectors transition losses of 0.2 dB can be achieved. Therefore, with the present invention it was desired to reduce this value to, for example, 0.1 dB. With a depth of roughness of already 30 nm there would be, according to the equation above, a transition loss of only 1 db, while the transition loss at a roughness depth of 10 nm would go down to values below 0.4 db. In practice, these values should be even lower, because according to the invention the optical contact allows, where it happens, a loss-free transition of radiation. It should be possible, to bring the values for transition loss down to values of good optical couplers of fibers. Due to the great slant angle of the end faces, extremely high return loss values in through position and in blocked position of the switch should be expected.

According to the invention it is especially beneficial in local network applications that the manufacturing costs of the inventive optical element, that can be used preferably as a switch or multiplexer or modulator, can be kept very low. Extensive adaptation techniques similar to the ones necessary for integrated optical light couplers, are not necessary. The inventive element is small, and, when provided with a piezoelectric element, it can be of a very compact design and should have good vibrational resistance values.

The preferred angle of the slanted end faces in relation to the optical axis of the fiber can be determined by experimentation. The normal of the slanted end face has an angle to the optical axis which exceeds the limit-angle of total reflection. The limit angle $\phi_o$ of total reflection is as follows:

$$\sin \phi_9 = n_2/n_1$$

where $n_1$ is the refractive index in the optically denser medium and $n_2$ is the refractive index in the optically thinner medium which can be assumed to be 1 in a gas atmosphere. The refractive index for quartz glass, which can be pure or slightly doped, has values between 1.44 and 1.46 for $n_1$ in wavelength ranges between 1.2 to 1.7 μm, so the angle of total reflection can be between 44° and 45°.

According to this, the angle of the slanted end face can be set to 45°, so that total reflection can be obtained.

For improving the values of transition loss it is important that the angles of the slanted areas that face each other are the same. This can, for instance, be accomplished such that the fiber is cut at a 45° angle with a very fine angle-saw. This angle should not be altered by subsequent polishing.

Especially beneficial would be a slight "bally" or convex form of the slanted areas because it improves the optical contact of the center of the fiber that is responsible for the transition loss.

Preferably, the external coating of the fiber in the end section should be removed. This step should be carried out only after the slanted end faces are polished and finished. When a quartz fiber with a diameter of 125 μm is used, the coating can be removed over an area of at least 0.5 mm, but a range of 1 mm will not yet lead to instability.

In an effort to optimize the element it is suggested to place the piezoelectric element directly between the displaceable ends of the fiber. Temperature effects can be kept to a minimum this way and it is advantageous that, when quartz is used as the piezoelectric crystal, about the same thermal expansion coefficients can be expected as they are found in optical fibers made of quartz.

The mounting of the element is the decisive factor for obtaining in the relaxed position a non-pass situation or a transition. When the slanted end faces are mounted so as to be parallel to each other, then there is a resting contact. When an intermediate position is realized, then the inventive optical element is operating like a working contact of a switch. In order to allow a symmetrical movement in both directions an intermediate position of 0.75 μm can be used, so that a displacement of 750 nm in one direction causes contacting and a displacement in the other direction causes a distance of 1500 nm. This symmetrical displacement for the piezoelectric crystal will be preferred when the inventive element is used as a modulator. The low assembly cost are advantageous because as a result of the contacting, the distance does not have to be calibrated.

According to a further embodiment of the invention, it is suggested to connect the transmitting section (here defined as first section) with a third section which extends transversely away from the end of the first end section. When the cutting angle is 45°, the third end section extends at an angle of 90°, so that during the blocking or non passing of the invented element the totally reflected light coming from the first end section enters the third end section that is located in the optical axis of the reflected light. Since in the case of contact of the first and second sector no or almost no light is reflected, the invention in this embodiment realizes a selector switch.

It is especially beneficial in this context, when the third end section has good optical contact with the optical fiber of the first end section. In order to accomplish this, the largest part of the coating of the pointed end of the first end section is removed and the end of the third end section is formed concavely so that it surrounds the quartz fiber of the first end section on one side. When an adhesive is used, it should have substantially the same refractive index so the losses at the transition area are minimized.

It is further suggested to form the third end section in a planar embodiment and to insert a correction element between the outer side of the first end section and the third end section. This correction element can have a refractive index profile that compensates the focusing effect as a result of the refractive index distribution in the first end section so that coupling losses are further reduced.

In an inventive element having three end sections, thus representing a selector switch, the second end section should be mounted so as to be movable. But it is also possible to mount a fourth end section to the second end section whereby the fourth end section corresponds essentially to the third end section that is mounted on the first end section. This embodiment represents a symmetrically built bi-directional switch, which basically can also be activated with a piezoelectric element. In this embodiment, however, it may become necessary to use a second piezoelectric element because of the larger displaced mass. When in optical contact position, light can pass from the first to the second or from the second to the first end section. In the non-pass position the light travels from the first into the third end section and/or from the second into the fourth end section.

BRIEF DESCRIPTION OF THE DRAWINGS

Further details, advantages, and specifications of the invention can be taken from the following description of several embodiments of the invention in conjunction with the accompanying drawing, in which.

DESCRIPTION OF PREFERRED EMBODIMENTS

Figure 1:
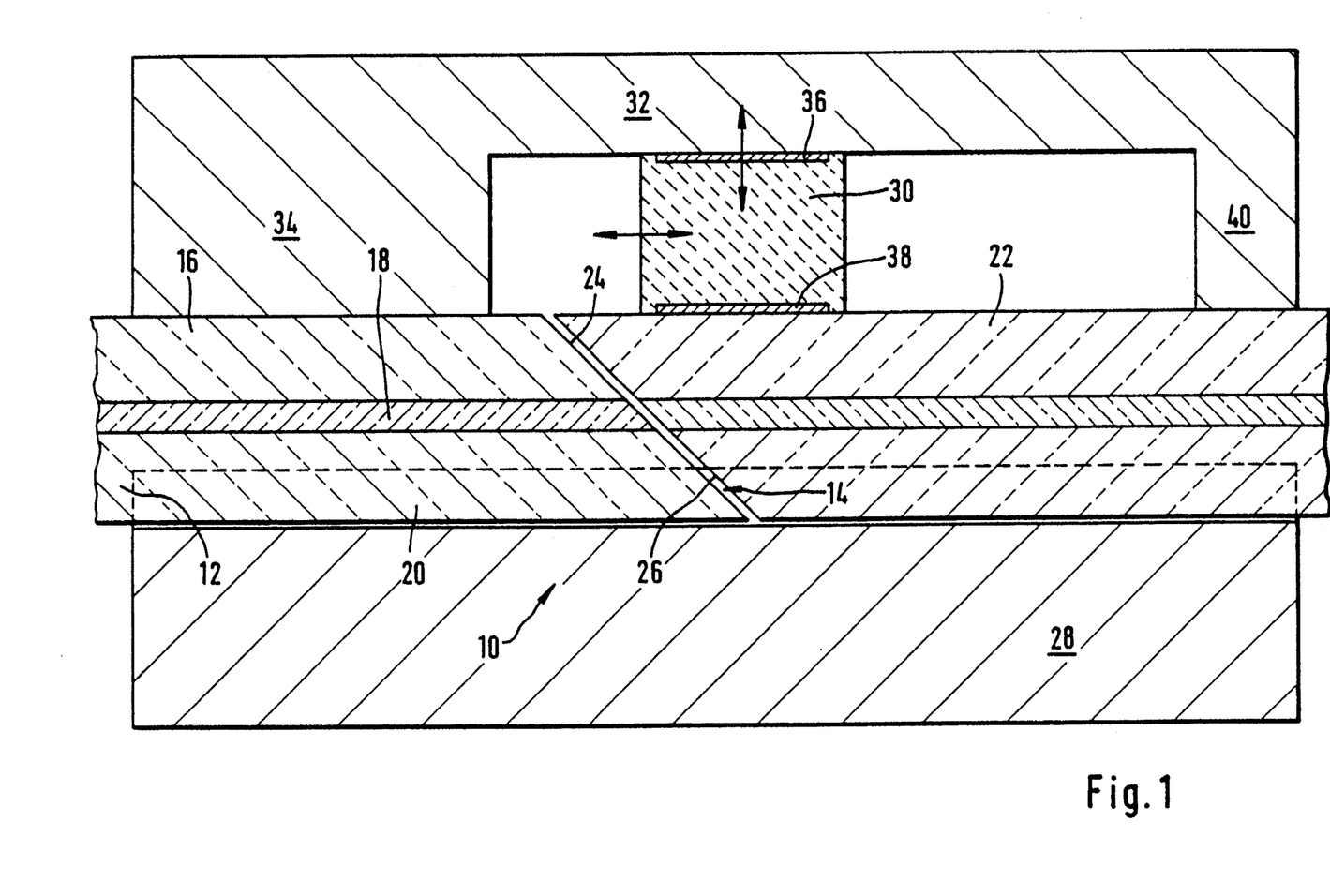
FIG. 1 shows the construction of the inventive optical element with the first and second end sections.

The inventive optical element 10 shows an optical fiber 12 which is separated by a miter joint 14. The fiber 12 shows a coating (mantle) 16 and a core (quartz glass fiber) 18. Because of the miter joint 14 the fiber 12 is separated into a first end section 20 and a second end section 22, whereby the first and second end sections 20, 22 have slanted end faces 24 and 26 facing each other. The cutting angle of the miter joint is approximately 45°. The slanted end faces 24 and 26 are each ground and polished in order to achieve, at least in the area of the fiber 18, a surface with a minimum depth of roughness.

Below the end sections 20 and 22 a support 28 is provided which has a V-groove on its upper side. This V-groove serves as a guide and as an aligning means for the end sections 20 and 22.

In this embodiment, the element is assembled such that in a resting position the slanted end faces 24 and 26 are spaced at a distance of 2 μm. Both end sections 20 and 22 are mounted in a casing filled with protective (inert) gas.

According to the present invention it is suggested to displace the second end section 22 relative to the first end section 20 in order to accomplish a switching or modulating function. For this purpose a displacing or adjusting element 30 in the form of a piezoelectric crystal is shown. The piezoelectric crystal is mounted on a holding bracket or coupling support 32 which with its leg 34 rests on the first end section 20.

The adjusting element 30 has two oppositely arranged electrodes 36 and 38 which preferably cause a change in thickness of the piezoelectric element 30. Both possible displacement directions, which are a change in thickness and a shearing action, are indicated in FIG. 1 with arrows. In the case of a change in thickness the second end section will be displaced in a radial direction, while in the case of a shearing action a displacement in the axial direction will follow. In the case of displacement in the radial direction, the limit frequency of the inventive optical element is higher because smaller masses must be moved. However, in both cases the displacements are so small that the inventive optical element always operates in the lower range of elastic deformation.

In the example shown the support 32 is U-shaped and has in addition to the leg 34 a further leg 40 for attachment in the area of the second end section. The support 32 provides a limit to the displacement in the radial direction.

The slanted end faces 24 and 26 are planar. A smoothness of less than 5 nm can practically be realized without problems. Therefore, no problems are to be expected in maintaining a smoothness of less than 10 nm on a larger technical scale so that the required transition loss specifications can be maintained.

The use of a casing that is filled with nitrogen or a noble gas or any other protective (inert) gas is very advantageous in order to protect the slanted end faces from soiling or chemical contamination by water vapor or other aggressive materials. For instance, a small quartz pipe could be used with the electrical wires extending through the ends. The dimensions would be similar those of a conventional melting coupler.

As is known per se the slanted end faces 22 and 24 may be polished to be slightly convex. The radius of curvature could be substantially larger than the radius known from optical connectors.

With the present invention it is especially advantageous that the moved mass is very low and that the displacement distance is only 1-2 μm. Assuming a quartz fiber has a diameter of 125 μm, a density of 2.2 g/cm³, and the fiber is displaced over a distance of 1 mm, then the mass is 30 μg.

On the other hand, oscillator quartzes are known in which gold is used as an electrode. The electrode has an area of one square millimeter and a layer thickness of 1 μm. As a result of the specific gravity of gold of 19.3 g/cm³, a gold electrode has a mass of 20 μg, which is in the same range as the moving mass of the inventive optical element. Such oscillating quartzes can be excited with frequencies of up to 150 MHz without problem.

Therefore, it can be assumed that the oscillating frequency will not be reduced substantially by connecting a displacable fiber end section thereto. Switching times of up to 10 nsec should thus be possible, so that the inventive optical element may also be used as a modulator for frequencies up to about 100 MHz.

The displaced mass of the inventive element can be reduced further when the coating (mantle) 16 is removed in the area of displacement and when the adjusting element 30 is thus brought closer to the core 18.

Figure 2:
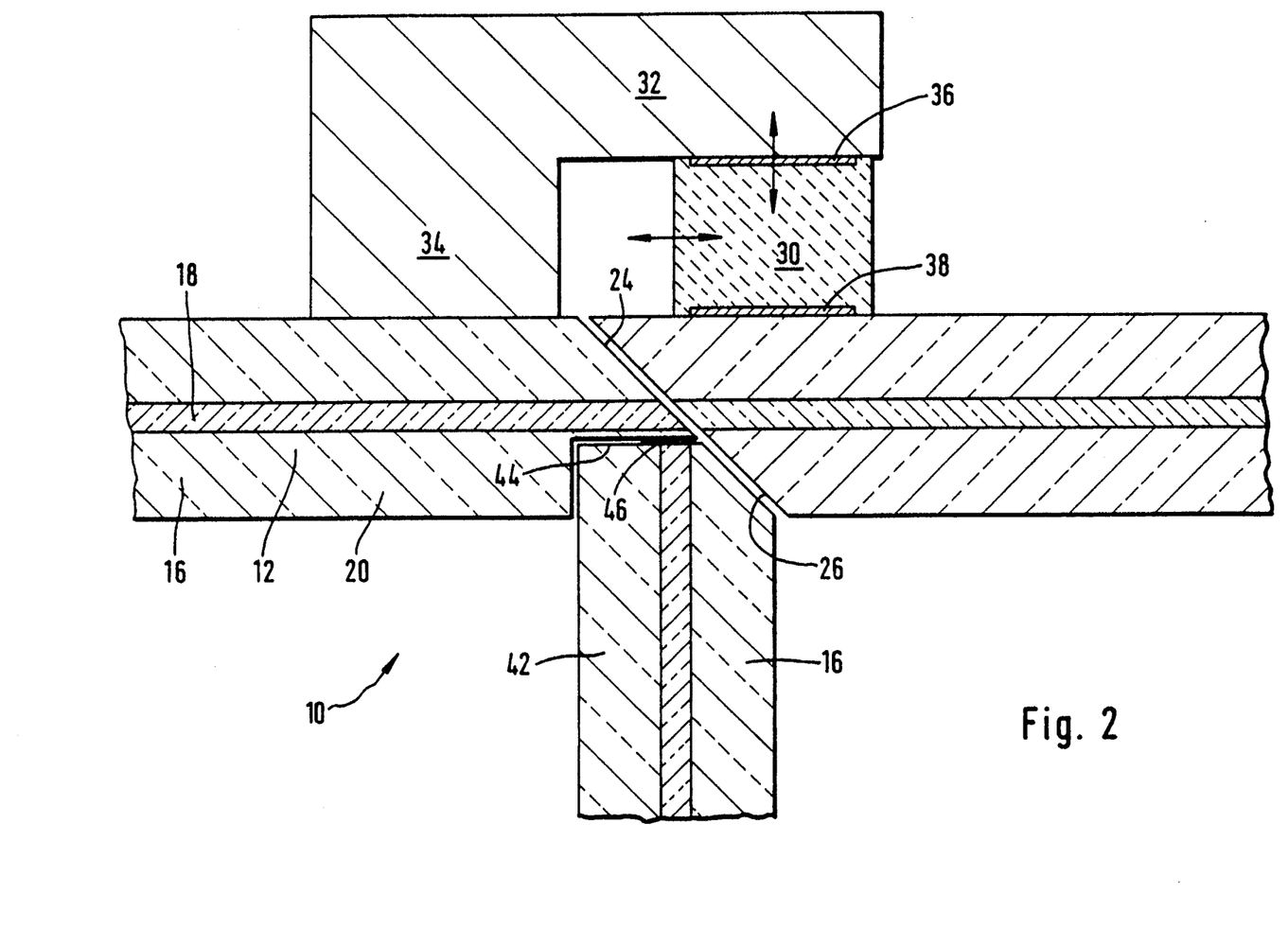
FIG. 2 shows a further embodiment of the inventive element with a third end section.

A further embodiment of the invented optical element 10 can be seen in FIG. 2. In this embodiment a third end section 42 is shown, in addition to the first 20 and second 22 end sections. This third end section 42 is optically coupled with the first end section 20. For this purpose the coating (mantle) 16 of the pointed end of the first end section 20 is removed. The third end section 42 ends in a planar surface 44. The light, entering the first end section 20 from the left, is reflected on the first slanted end face 24, when the optical element 10 is in a non-pass or blocking state, and then enters the core of the third end section 42. The reason why some of the coating 16 close to the core 18 of the first end sections 20, 22 is still present, is to keep the radiation losses low when the switch is in its transition position. The remaining thickness of the coating 16 can be, for instance, a few micrometers.

The light beam going through the first end section will experience a slight focusing effect due to the refractive index distribution of the first optical fiber, because the refractive index distribution has the effect of a weak cylindrical lens. This light beam deformation leads to small coupling losses for the third end section 42. By using a coupling or connecting element 46 between the two optical fibers, that has a matching refractive index distribution, the losses of the optical fiber 12 can be minimized. The coupling or connecting element 46 can be mounted either on the planar surface 44 of the third end sector 42 or on the ground area of the end section 20.

While in its transition position the light beam completely passes from the end section 20 to the end section 22, in the non-pass state the entire light beam is deflected from end section 20 into the third end section 42.

In the embodiment of FIG. 2 the support 32 is L-shaped whereby it is ensured that a stable relative support between the first and second end sections 20 and 22 is provided. The leg 34 is fixedly connected to the first end section 20 with an appropriate adhesive. The support 32 consists of quartz glass and connects, with the electrodes 36 and 38 of the adjusting element 30, the end sections 20 and 22 with each other. In selecting the adhesive care must be taken to find one that does not affect the slanted end faces 24 and 26.

Figure 3:
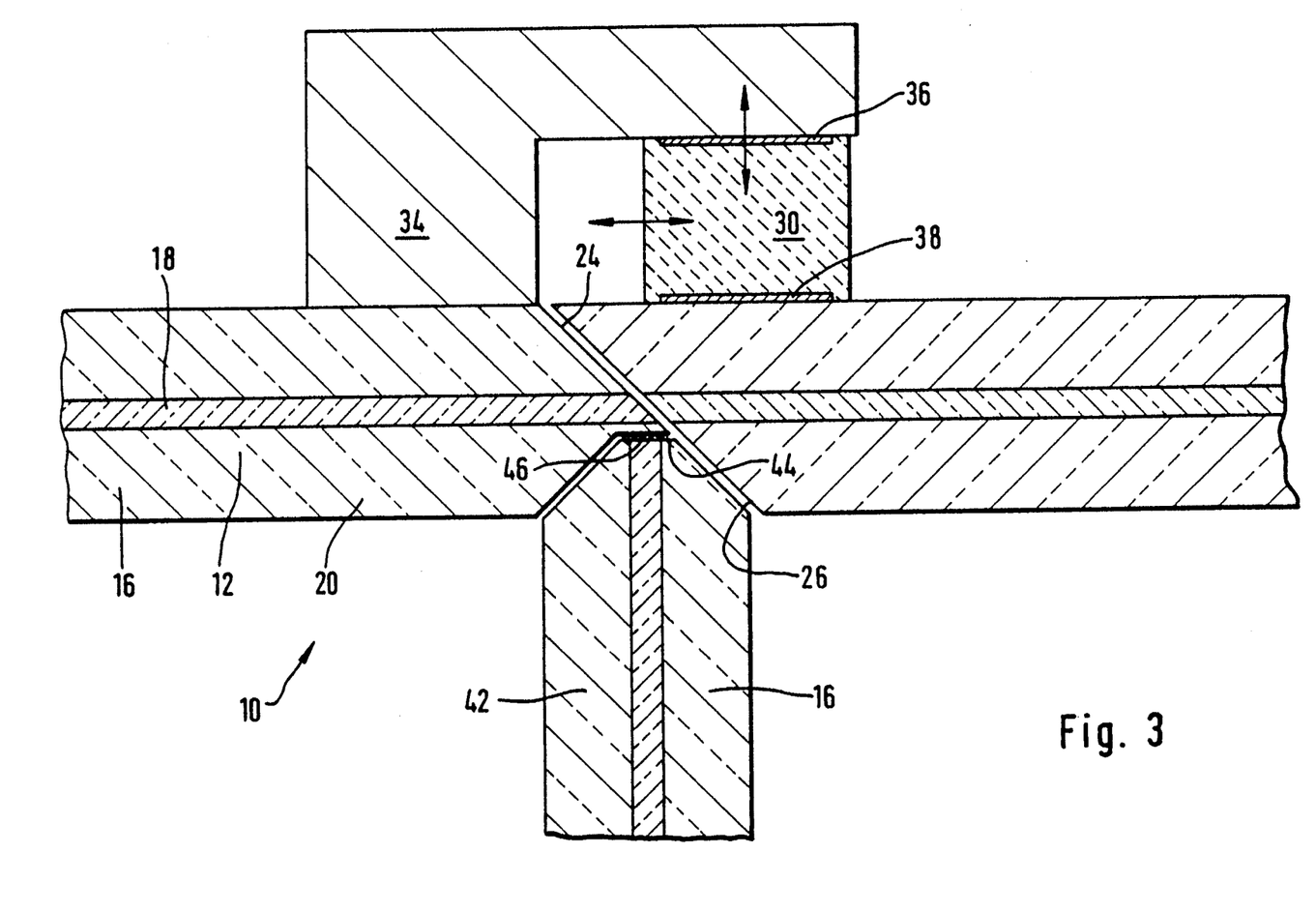
FIG. 3 shows a different embodiment of FIG. 2.

A further embodiment of the inventive optical element 10 can be seen in FIG. 3. This embodiment is different from the one described in FIG. 2 mainly by the construction of the end section 42. The coating (mantle) 16 of the third end section in this case has a conical shape which allows an improved adaptation to the coating 16 of the first end section 20, which is designed to function as a guiding surface.

Figure 4:
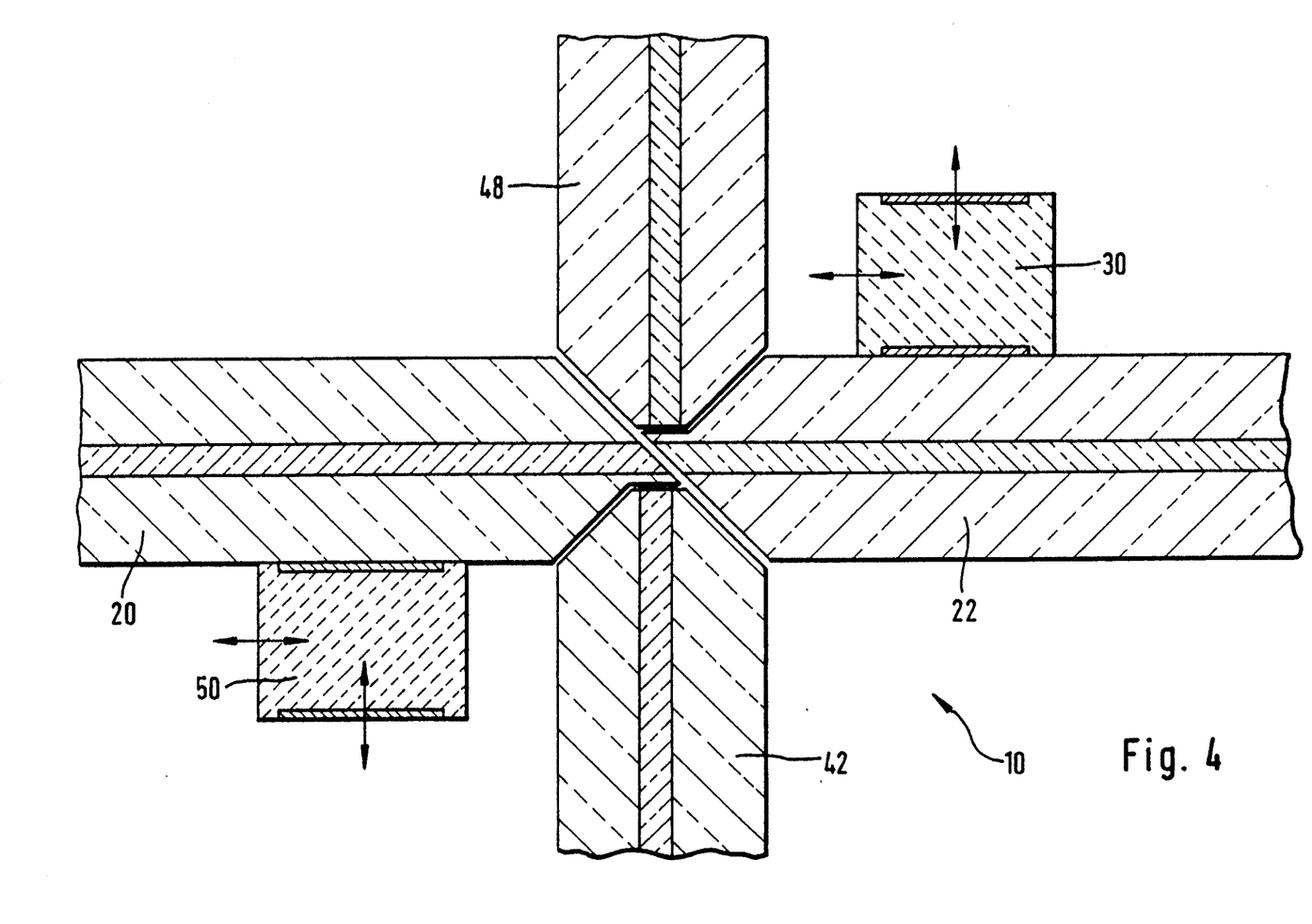
FIG. 4 shows a further embodiment of the inventive element with four end sections.

In FIG. 4 a further embodiment of the inventive optical element 10 is shown. This optical element, in contrast to FIG. 3, has an additional fourth end section 48 and an additional adjusting element 50, which corresponds in its design to the adjusting element 30. The optical element 10 in FIG. 4 is symmetrical and allows the realization of a bi-directional switch. The fourth end section 48 acts as an additional optical coupling fiber and is built like the third end section 42 in FIG. 3. It is however mounted on the second end section 22 and not on the first end section 20.

The optical element therefore provides an additional light path from the second end section 22 into the fourth end section 48. Since in this embodiment a further transversely extending end section 42, respectively, 48 in addition to the first and second end sections 20 and 22 must be displaced, it seems appropriate to use a further adjusting element 50. This adjusting element 50 should be operated in synchronization with the element 30 and thus allows for a doubling of the displacing forces. This is advantageous in view of the increased masses.

The further extension of the end sections 42 and 48 should preferably be bent in order to increase the axial movability.

Such optical elements can preferably be used in local networks as bi-directional switches.

Figure 5:
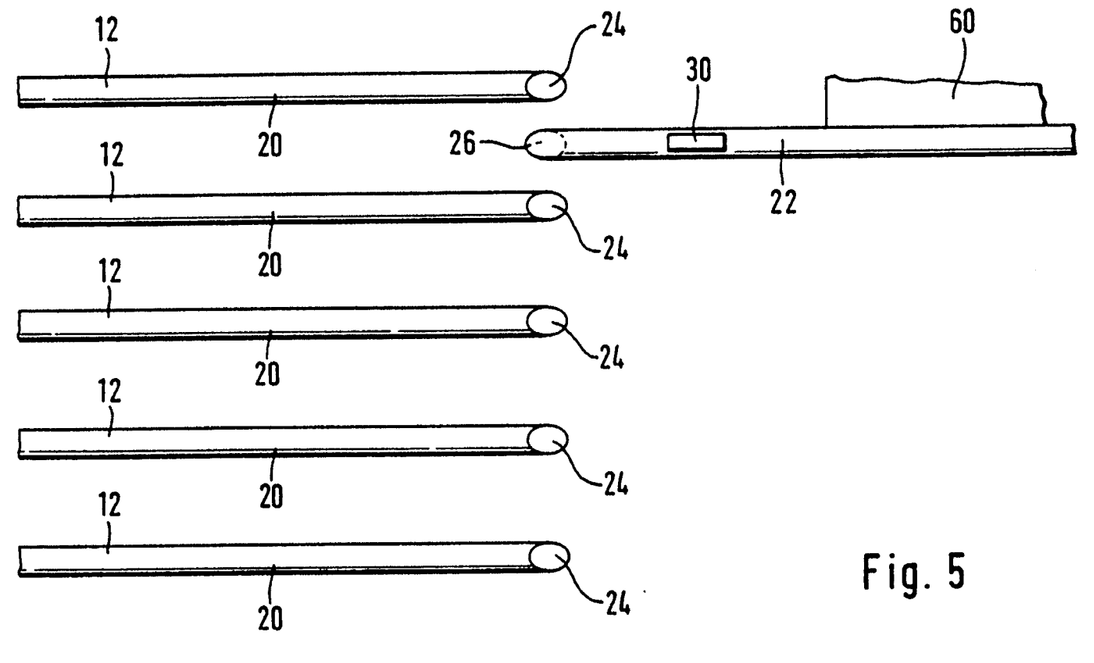
FIG. 5 shows a plan view of a further embodiment of the invention comprising a plurality of fixed fiber end sections.

As may be taken from FIG. 5, a plurality of fibers 12 is arranged essentially in parallel to each other with the fiber end sections 20 being adjacent and aligned to each other. The displaceable end section 22 may be moved such that a selected fiber end section 20 can be coupled to the displaceable end section 22.

Also, in this embodiment the movable end section 22 may be displaced by a piezoelectric element. A piezoelectric element 60, a part of which is shown in FIG. 5, provides for the required displacement for switching between the fixed fiber end sections 20. Additionally, the piezoelectric element 30 is arranged on the movable end section 22 such that a coupling and decoupling between the slanted end faces 24 and 26 is possible as described above.

It is to be understood that more than the shown five fixed optical fiber end sections may be used for multiplexing a plurality of optical fibers. Also, the slanted end faces 24 may be arranged in a part-circular arrangement for ease of switching between the optical fibers 12.

The present invention is, of course, in no way restricted to the specific disclosure of the specification and drawings, but also encompasses any modifications within the scope of the appended claims.

What we claim is:

1. An optical element for affecting light transmission characteristics of an optical system, said optical element comprising:
    at least a first and a second optical fiber, said first optical fiber having a first end section and said second optical fiber having a second end section to be optically coupled and decoupled to one another;
    each one of said first and said second end sections having a slanted end face, with an angle of slant of at least one said slanted end faces exceeding a critical angle of total reflection; and
    at least one of said first and said second end sections being displaceable relative to the other one of said first and said second end sections, wherein a distance of displacement between said slanted end faces is substantially smaller than a diameter of said optical fibers so as to provide optical coupling therebetween.

2. An optical element according to claim 1, wherein said optical fibers are divided optical fibers.

3. An optical element according to claim 1, wherein said distance of displacement is defined between a position of contact of said slanted end faces and a spaced-apart position of a spacing of at least 1 μm.

4. An optical element according to claim 3, wherein in said spaced-apart position said spacing is transverse to an axis of said optical fibers.

5. An optical element according to claim 1, wherein said optical element performs a switching function.

6. An optical element according to claim 1, wherein said optical element performs a multiplexing function.

7. An optical element according to claim 1, wherein said optical element performs a modulating function.

8. An optical element according to claim 1, further comprising a first adjusting element for displacing said displaceable one of said first and said second end sections, said first adjusting element being a piezoelectric element.

9. An optical element according to claim 8, wherein:
    one of said first and said second end sections is displaceable and the other one of said first and said second end sections is stationary;
    said distance of displacement is substantially one millimeter;
    each one of said first and said second optical fibers, including said first and said second end sections, is comprised of a core and a mantle; and
    at least in an area of displacement of said displaceable one of said first and said second end sections said mantle is partially removed.

10. An optical element according to claim 8, wherein said piezoelectric element is selected from the group consisting of a piezoelectric crystal and a piezoelectric ceramic.

11. An optical element according to claim 10, wherein said piezoelectric crystal is quartz.

12. An optical element according to claim 8, further comprising a mechanical coupling support for connecting said first and said second end sections to one another, said coupling support designed such that a spacing between said first and said second end sections varies only very little with temperature variations.

13. An optical element according to claim 16, wherein said coupling support is comprised of quartz glass and extends in a direction of a main axis of said first adjusting element.

14. An optical element according to claim 8, further comprising a third said optical fiber and a third said end section, wherein:
    each one of said first and second optical fibers, including said first and second end sections, is comprised of a core and a mantle;
    in an area of tapering of said end face of one said first and said second end sections a portion of said mantle is removed to form a first surface that is substantially parallel to an axis of said first and said second optical fibers;
    said third end section has an end face that abuts at said first surface; and
    said third end section, when said first and said second end section are decoupled, receiving a totally reflected light beam.

15. An optical element according to claim 14, wherein said portion of said mantle is removed to a thickness of a few μm and wherein said end face of said third end section is adapted to said first surface that is planar, wherein said third optical fiber extends transverse to said first and said second optical fibers.

16. An optical element according to claim 15, wherein said third optical fiber extends perpendicular to said first and said second optical fibers.

17. An optical element according to claim 16, further comprising a correcting element positioned between said planar surface and said end face of said third end section, said correcting element having a refractive index distribution for correcting a light beam deformation of said reflected light beam.

18. An optical element according to claim 14, further comprising a fourth said optical fiber and a fourth said end section, wherein:

in an area of tapering of said end face of the other one of said first and said second end sections a portion of said mantle is removed to form a second planar surface that is substantially parallel to an axis of said first and said second optical fibers; and said fourth end section has an end face that abuts at said second planar surface.

19. An optical element according to claim 18, wherein said third end section is fixedly connected to said first surface and wherein said third end section and said one of said first and said second end sections are displaceable together by said first adjusting element.

20. An optical element according to claim 18, further comprising a second adjusting element, wherein said fourth end section is fixedly connected to said second planar surface and wherein said fourth end section and said other one of said first and said second end sections are displaceable together by said second adjusting element.

21. An optical element according to claim 1, wherein said angle of slant of said slanted end faces is substantially identical.

22. An optical element according to claim 1, wherein one of said slanted end faces has a depth of roughness of less than 30 nm.

23. An optical element according to claim 22, wherein said depth of roughness is less than 10 nm.

24. An optical element according to claim 1, wherein at least one of said slanted end faces is convexly shaped.

25. An optical element according to claim 1, further comprising a casing for receiving said first and said second end sections.

26. An optical element according to claim 25, wherein said casing is filled with an inert gas.

27. An optical element according to claim 25, wherein said casing is at least partially evacuated.

28. An optical element according to claim 25, wherein said casing is comprised of a material having a low thermal expansion coefficient.

29. An optical element according to claim 28, wherein said material is quartz.

30. An optical element according to claim 1, further comprising a first and a second adjusting elements, said first adjusting element connected to said first end section for adjusting a position of said first end section relative to said second end section and said second adjusting element connected to said second end section for adjusting a position of said second end section to said first end section.

31. An optical element according to claim 1, further comprising a relative adjusting element for adjusting a relative position of said first end section relative to said second end section.

32. An optical element according to claim 1, wherein said second end section of said second optical fiber is displaceable and wherein several of said first optical fibers with said respective end sections are provided, said first end sections being stationary, said second end section displaceable such that a selective coupling and decoupling with each one of said first end sections is possible for multiplexing a plurality of said optical fibers.

33. An optical element according to claim 32, wherein said slanted end faces of said first and said second end sections during coupling are positioned such that said slanted end faces are substantially in a same plane.

* * * * *